Figure 1:
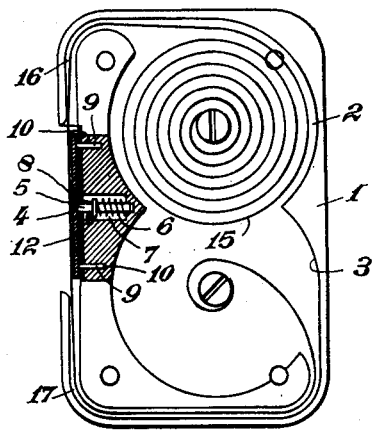

Sept. 15, 1931.  K. MORSBACH  1,823,462
PHOTOGRAPHIC CAMERA
Filed March 26, 1930

INVENTOR
KURT MORSBACH
By
ATTORNEYS.

Patented Sept. 15, 1931

1,823,462

UNITED STATES PATENT OFFICE

KURT MORSBACH, OF BERLIN-LICHTERFELDE, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

PHOTOGRAPHIC CAMERA

Application filed March 26, 1930, Serial No. 438,946, and in Germany April 2, 1929.

The invention relates to photographic cameras, and more particularly to film cameras with interchangeable cassettes and a film guiding channel located in the interior of the camera behind its objective. The portion of the film projecting from the interchangeable cassette, film-holder or box is introduced into the film guide channel when the cassette is placed into the camera. The introduction of the film strip into the type of film guide channel which is rigidly combined with the camera is, however, complicated and a considerable portion of the film strip, is generally exposed to the light, unless the cassette is inserted into the camera in a dark-room. The inconvenience connected with the introduction of the film strip into the film channel in known cameras is particularly disturbing in amateur cameras as no particular experience and skill can be expected from an amateur photographer.

It has been attempted to eliminate this defect mentioned by placing the total film guide channel, which consists of the member carrying the window for the image and the pressure plate, into the interchangeable cassette. In this arrangement the film need not be placed into the guide channel by the user of the camera but this introduction is effected by the manufacturer or dealer of the film when he loads the cassette or film-holder. These cassettes also have a very serious defect. It is well known in the art that the focal lengths always vary in individual objectives. It is therefore necessary that the guide plate for the film carrying the window for the image be always adapted to the individual properties of the objective, as far as its spacing from the objective is concerned in order to attain the requisite distinctness of the image. Such an adaptation is naturally impossible if the film cassette carries the film guide plate in which the window for the image is provided, as it is impossible to know beforehand in which camera a certain film cassette is to be used. In view of the peculiarity of the art, and in particular of the film amateur art, it is also impossible to supply for a certain camera a certain film cassette specially adapted to a camera since in the case in question the film is always sold packed in a cassette and this cassette returns after the exposure of the film for the purpose of its development and for reloading into the hands of the film manufacturer or film dealer. It would thus be practically impossible to return to a certain person always the same reloaded cassette. It would be necessary to design the film cassettes in such a way that each film cassette pertaining to a certain type of camera fits each individual camera of this type.

By the present invention a film camera is provided in which by a peculiar arrangement of the parts of the film guide channel the special introduction of the film strip into the film channel is eliminated and by which at the same time absolute distinctness of the image is attained in spite of the unavoidable differences in the focal lengths of the objectives of the various cameras.

According to this invention the camera containing the photographic objective is not provided with the total film guide channel but with a film guide plate containing only the window for the image. The spring-controlled pressure plate which forces the film against said guide plate carrying the window for the image, is provided on the film cassette. In contrast with the known apparatus in which the members forming the film guide channel, viz. the pressure plate and the guide plate carrying the window, are mounted on the same carrier, either the camera or the cassette, these two members of the film guide channel are according to this invention mounted separately from each other on different parts of the apparatus, the pressure plate on the cassette and the guide plate in which the window is provided, on the camera. In this way it is, on the one hand, possible to adapt the distance between the guide plate containing the window and the objective, accurately to the focal length and on the other hand, to introduce the film instantly into the guide channel by simply placing the film cassette into the apparatus, the guide channel being formed by the adjoining parts, viz. the pressure plate and the guide plate.

The same advantage, to enable the cassette filled with the film to be placed into the camera without any particular handling of the end of the film strip projecting from the cassette, is attained if the cassette is provided with a recess or opening behind the film exposure point so that the pressure plate of the film channel is able to engage this recess and that the film strip projecting from the cassette retains its stretched position at all times within the camera as well as external to it. The film guide channel totally located within the camera, in its position in relation to the film cassette to be introduced into it, is preferably so located that the film strip accommodated in it when the cassette is placed into the camera does substantially not change its position when the film channel is open or when it is closed.

A preferred embodiment of the invention in which the pressure plate is mounted on the cassette consists in detaining the pressure plate for the film, prior to the insertion of the film into the cassette, by a locking device in the withdrawn position and to release this lock automatically when inserting the cassette so that the pressure plate is able to force the film against the guide plate.

Figure 2:
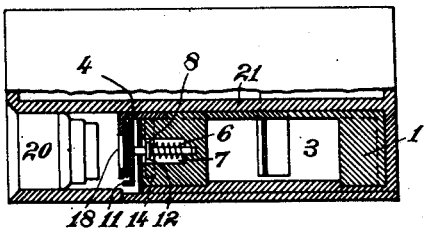
Figures 3, 4, 5:
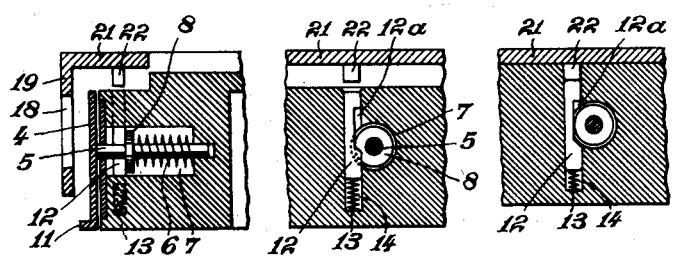

An embodiment of the invention is by way of example illustrated in the drawings affixed to the specification. In the drawings:

Fig. 1 represents a film cassette for the camera according to the invention in sectional elevation, Fig. 2, the improved film camera, consisting of the camera proper and the film cassette, in sectional elevation, and Figs. 3 to 5 locking mechanisms for the pressure plate located in the film cassette, on an enlarged scale.

Like parts are indicated by like numerals of reference throughout all the figures of the drawing.

Referring to Fig. 1 of the drawing, it will be observed that the film cassette 1 is internally sub-divided into two compartments 2 and 3 for the film reel to be unwound and the reel to be wound. In the front wall of the film cassette is according to the invention located the slideable pressure plate 4. The pressure plate 4 is provided with a guide pin 5 controlled by a helical spring 6. The spring 6 is located within a bore 7 of the wall of the cassette. One end of the spring abuts against the collar 8 of the guide pin 5 while its other end rests upon the bottom of the bore 7. Pins 9 serve for the guidance of the pressure plate 4 and are located in corresponding bores 10 of the cassette. The pressure plate along one side is provided with a projecting guide rim or flange 11.

As long as the cassette has not been introduced into the camera the pressure plate 4 is locked, as illustrated in Figs. 3 and 4 of the drawing. The lock is effected by a sliding bolt 12 controlled by a spring 13. The central portion 12a of the bolt 12 is notched. The spring 13 and the bolt 12 are located in a bore 14 of the cassette. The bore 14 extends right through at the rear of the cassette. To prevent the bolt 12 from turning in the bore 14 the bolt and the bore may be made rectangular. The spring 13 tends to keep the bolt 12 in the position shown in Fig. 4, in which the collar places itself in front of the collar 8 and thus keeps the collar in the position illustrated in Figs. 3 and 4.

The flexible film 15 located in the interior of the cassette is guided from an unwinding roller or reel through a channel 16 provided in the wall of the cassette across the pressure plate 4 and a further channel 17 to the winding roller or reel.

The cassette is furthermore provided with a mechanism, not shown in the drawing, adapted to propel the film. This device which does not form part of the present invention might, for instance, consist of slots through which a propelling mechanism of any suitable construction engages the film.

In the interior of the camera there is according to the invention merely located the guide plate 19 containing the window 18. The distance of the inner surface of the guide plate 19 from the objective 20 is accurately adapted to the focal length of the objective. There is further fixed in the wall 21 partitioning the cassette chamber from the clockwork housing a pin 22 which serves for the release of the lock 12 for the pressure plate 4.

When introducing into the camera a film cassette containing the unexposed film, this is effected in such a manner that the loaded film cassette, the pressure plate of which is at first in the locked position, is placed into the cassette chamber of the camera. The pin 22 then contacts with the front face of the sliding bolt 12 and forces it back against the resistance of the spring 13. The bolt 12 is then brought into the position shown in Fig. 5 in which the collar 8 is no longer prevented from moving forward under the action of the spring 6 and to carry along the pressure plate 4. After the introduction of the cassette into the camera this plate 4 forces the flexible film 15 against the guide-plate 19 containing the window 18 for receiving the image so that the camera is quite ready for service without any further handling.

If the pressure plate 4 is mounted at the partition wall 21, and is spring-controlled as described above, the cassette provided with a recess or opening is so placed into the camera, that the portion of the film passing the said recess is located between the guide plate 19 and the pressure plate 4. The pressure plate then engages the recess of the cassette. The release of the spring-controlled pressure plate for pressing the film against the guide plate 19 takes place when the cassette is placed on the partition wall 21 from which projects a pin bringing about a release of the lock. Here also no further handling is necessary when introducing the cassette into the camera.

It will be understood that structural changes and modifications may be made without departing from the spirit of the invention and the ambit of the appended claims.

I claim as my invention:

1. In a film camera with interchangeable cassette and a film guide channel located in the interior of the camera behind its objective, a guide plate carrying the window for the image and permanently located behind the objective and in its focus, and a pressure plate independently mounted on said cassette.

2. In a film camera with interchangeable cassette and a film guide channel located in the interior of the camera behind its objective, a guide plate carrying the window for the image in the focus of the objective, a pressure plate, guide members mounted upon said pressure plate, and a spring upon one of said guide members so that said pressure plate may be displaced against the resistance of said spring.

3. In a film camera with interchangeable cassette and a film guide channel located in the interior of the camera behind its objective, a guide plate carrying the window for the image in the focus of the objective, a pressure plate, guide members mounted upon said pressure plate, a spring upon one of said guide members, and a locking device adapted to engage said spring-mounted pressure plate.

4. In a film camera with interchangeable cassette and a film guide channel located in the interior of the camera behind its objective, a guide plate located behind the objective at the distance of the focal point and carrying the window for the image, a pressure plate mounted on said cassette, guide members mounted on said pressure plate, a spring and one of said guide members, a locking device adapted to engage said slidable pressure plate, and a pin mounted in the camera opposite said locking device and adapted to release the lock of said pressure plate when said cassette is introduced into said camera.

5. In a film camera with interchangeable cassette and a film guide channel located in the interior of the camera behind its objective, a guide plate located behind the objective and carrying the window of the image in the focus of the objective, a pressure plate, and a lateral guide strip on said pressure plate.

6. In a film camera with interchangeable cassette on a film guide channel located in the interior of the camera behind its objective, a guide plate located behind the objective and in its focus, a pressure plate mounted on said cassette, a recess in the side of said cassette across which the film is guided so that said pressure plate is able to engage said recess behind the film.

7. A film cassette for film cameras, comprising two compartments constructed of sheet iron for the winding and unwinding rollers, a solid connecting member between said sheet iron walls in which there are provided a plurality of bores, a recess in said connecting member at the front of the cassette across which the inserted film is guided in a straight line, a pressure plate located in said recess, a plurality of guide pins upon said pressure plate projecting into said bores, a collar upon the central one of said guide pins, a helical spring wound around said guide pin abutting at one end against said collar and at the other end against the bottom of the bore in which it is located, and a spring-controlled bolt adapted to contact with said collar and to retain said pressure plate in a retracted position.

In testimony whereof I affix my signature.

KURT MORSBACH.